3,156,524
PREVENTION OF INSOLUBLE MOLYBDENUM-
AMINE COMPLEXES IN THE LIQUID-LIQUID
EXTRACTION OF URANIUM USING AMINE
EXTRACTANTS
James L. Drobnick, Golden, and Clifford J. Lewis, Lakewood, Colo., assignors to General Mills, Inc., a corporation of Delaware
Filed Sept. 22, 1958, Ser. No. 762,424
7 Claims. (Cl. 23—14.5)

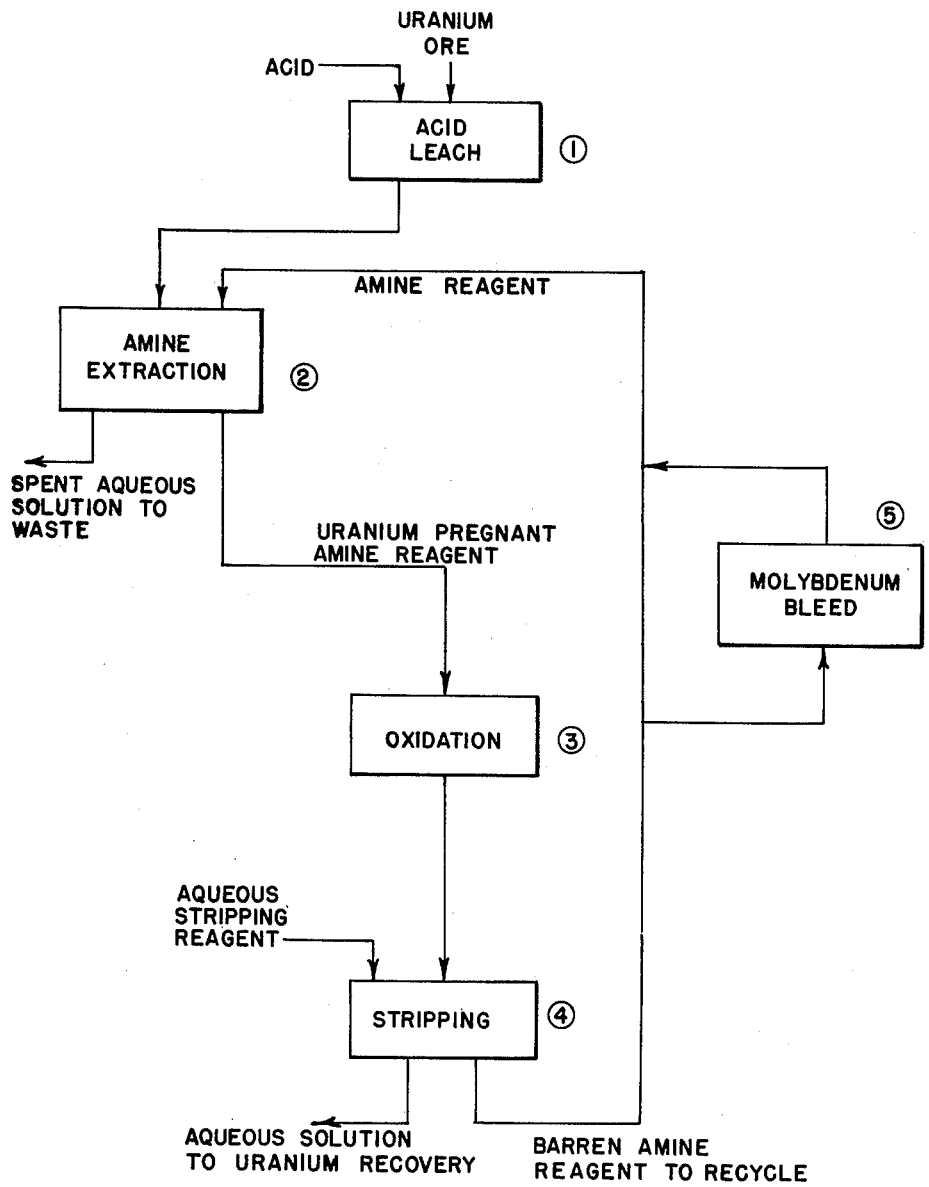

The present invention involves a process for extracting uranium from its ores involving the use of liquid amine extractants. In such processes, molybdenum, which frequently accompanies uranium ores, has heretofore caused some operating difficulty in that it precipitates as a complex with the amine extractant in the process and interferes with the efficient separation of the uranium.

In the typical uranium extraction process the uranium ore is leached with an aqueous acid solution such as sulfuric acid in order to produce a solution containing the uranium values. The uranium values are extracted from this aqueous solution by a non-aqueous amine solution and the uranium values are recovered from the amine solution by an aqueous stripping solution. Molybdenum which ordinarily accompanies uranium in ores of this type is likewise soluble in the acid leaching solution and is likewise soluble in the amine extractant. The molybdenum, however, appears to remain in the amine extractant and is not stripped therefrom by the aqueous solution commonly employed for stripping the uranium. Accordingly, the molybdenum tends to build up in the amine extractant, and it is necessary to bleed off a stream of this amine extractant for the purpose of stripping molybdenum from it.

It is found, however, that in ordinary operation the molybdenum seems to form some sort of complex with the amine extractant, which complex is insoluble and appears at the interface between the organic phase, amine extractant and the aqueous stripping solution for the uranium. While the presence of these interfacial solids in the stripping circuit does not completely stop the operation, these solids must either be removed along the circuit or will be lost. Moreover, in the removal of these solids along the circuit, amine reagent is lost thus increasing reagent costs.

It has now been discovered that the insoluble molybdenum-amine complex occurs when some of the molybdenum is present in the molybdyl form. By maintaining the molybdenum in the molybdate form it has now been found that the interfacial solids do not appear in the amine extractant, and accordingly, it is possible to operate the process at efficient levels.

It is, therefore, an object of the present invention to provide a novel proces for the extraction of uranium from its ores involving the use of amine extractants in which the appearance of green interfacial solids in the amine extractant is prevented.

The invention will be described with reference to the drawing which is a flow sheet of a typical uranium extraction process. The finely divided uranium ore is leached with a strong mineral acid such as sulfuric or hydrochloric. Sulfuric acid is preferred because of its low cost. This leaching step dissolves the uranium, molybdenum, iron, and aluminum principally, and the separation process involves the isolation of the uranium from this solution. The acid solution is then subjected to a liquid-liquid extraction with any of a variety of amines which will be described in more detail hereinafter. The organic phase amine extractant is immiscible with the aqueous phase, and the uranium is transferred from the aqueous phase into the organic phase. The process involved is essentially an ion exchange reaction. The amines represent an anion exchange reagent. Since uranium in its acid leach solutions exists in an equilibrium involving uranium in the form of anions and cations, it can be "solvent extracted" by the amines as anion exchange reagents, the removal of uranium anions causing the equilibrium to shift until all of the uranium is removed. Molybdenum also exhibits this equilibrium, and accordingly, accompanies the uranium in the amine extraction. Other metals such as iron and aluminum which are present in the acid leach exist only as cations in the pH range involved, and accordingly, these metals are not picked up by the amine reagents.

In the prior art processes the uranium-pregnant amine reagent is sent directly to a stripping operation in which it is contacted with an aqueous solution generally consisting of sodium chloride acidified with sulfuric acid. This solution readily strips uranium from the organic phase. Molybdenum ions, however, form strong associations with amine extractants and are not readily removed by such stripping agents as acidified sodium chloride solutions. An aqueous solution of sodium carbonate is effective for stripping molybdenum from these amine reagents. Accordingly, a "bleed stream" technique has come into practice wherein the conventional acidified sodium chloride solution is used as the primary uranium stripping solution, and a small bleed stream of the uranium barren organic phase is routed through a sodium carbonate strip solution which removes the molybdenum. The bleed stream of amine reagent is then combined with the main stream of reagent for recycling to the operation. In this manner the molybdenum concentration in the organic phase is held at a definite level. However, some molybdenum-amine complex does remain in the organic phase and can build up to cause the difficulty referred to previously namely the formation of a precipitate which deposits at the interface of the organic and aqueous phases in the stripping cells. This gives rise to mechanical difficulties in a circuit which was designed to be completely liquid at all times. While various water immiscible additives can be incorporated in the organic phase to render this molybdenum-amine precipitate soluble, this is still not a complete solution to the problem.

These additives are relatively expensive and would have to be used in considerable quantity in order to accomplish the desired end. They would thus decrease the extractive potential of the organic phase or at least increase the volume of the organic phase handled. Moreover, the amount of additives required could well lead to emulsion difficulties as well as to an impractical rate of phase disengagement.

As was indicated previously, it has been discovered that the formation of this molybdenum-amine complex appears to be based upon the presence of molybdenum in the molybdyl form in the amine reagent. By the introduction of an oxidizing step between the extraction and stripping steps, it is found possible to maintain the molybdenum in the molybdate form thus preventing the formation of the molybdenum-amine complex at ordinary molybdenum concentrations in the organic phase. It is not known whether the oxidation step involves an oxidation of the molybdyl form to the molybdate form or merely the prevention of the reduction of the molybdates form to the molybdyl form. In any event, it has been observed that when an oxidant is employed at this point the build up of molybdenum in the molybdyl form does not occur.

A variety of oxidizing agents may be useful for accomplishing this oxidation step. A simple and inexpensive means of accomplishing this is by the introduction of aqueous hydrogen peroxide into the process at this point. The uranium-pregnant amine reagent may be scrubbed with a dilute aqueous solution of hydrogen peroxide such as one containing approximately 1.5 percent by weight of hydrogen peroxide. This aqueous scrubbing solution of hydrogen peroxide may be recovered and reused with the hydrogen peroxide being built up continuously to approximately this level.

Following the stripping of the uranium-pregnant amine reagent, the amine reagent may be recycled with only a small bleed stream being taken off for the removal of molybdenum. Generally, a 20 percent volume bleed stream or less may be used for this purpose. Bleed streams down to as little as 5 percent of the amine reagent being recycled have been found effective for maintaining the molybdenum level low enough for numerous cycles of the organic circuit. Generally, however, bleed streams in the range of 10 percent of the volume of the recycled amine reagent are preferred.

It will be appreciated that the above description is with reference to the drawing which is a flow sheet of a simplified extraction system. It will also be appreciated that in commercial practice the process would most efficiently be conducted on a system involving multiple stage extraction and stripping in which counter current flow would generally be employed. Those skilled in this art will readily appreciate the manipulative steps which may be employed to utilize the herein described process on a commercial scale.

*Example I*

In this example a Dysart liquor was employed having the following analysis:

| | |
|---|---|
| $U_3O_8$ | g./l.__ 1.85 |
| Mo | g./l.__ 0.058 |
| E.m.f. | mv.__ 400 |
| pH | 1.2 |

The amine employed was a tertiary alkyl amine in which the alkyl groups were straight chain hydrocarbon groups containing principally 8 and 10 carbon atoms with a minor amount of 12 carbon atom alkyl groups. These alkyl groups were derived from the mixed $C_8$, $C_{10}$, and $C_{12}$ acids of coconut oil. The amine reagent was composed of 87.5 parts by weight of kerosene, 10 parts by weight of diisobutyl ketone and 2.5 parts by weight of the above-mentioned tertiary alkyl amine. The extraction was conducted in five stages with a volume ratio of the organic extraction agent to acid liquor of 1:3, two stages of a hydrogen peroxide scrub of the uranium-pregnant amine reagent with a 1.5 percent by weight of hydrogen peroxide solution having a pH of 1.0 (adjusted with sulfuric acid), and three stages of stripping with a 1 molar solution of sodium chloride acidified to pH 1.0 with sulfuric acid. The stripping circuit was operated with a volume ratio of organic amine reagent to acid stripping reagent of 4:1. The process was conducted continuously through a series of cycles of the organic flow and a 20 percent volume bleed of the organic stream was employed to strip the molybdenum thereby keeping the molybdenum content in the organic phase to a minimum. The stripping of the molybdenum was accomplished by means of a 10 percent by weight solution of sodium carbonate in water. The results are indicated in the following table:

| I | II | III | IV |
|---|---|---|---|
| Cycles of Operation Based on Organic Flow | $U_3O_8$ in Uranium Barren Solution (g./l.) | Mo (g./l.) in Tri-Fatty Amine (g./l.) | $H_2O_2$ consumption per cycle, Lb. $H_2O_2$ per Lb. $U_3O_8$ in Feed Liquor |
| 1 | 0.026 | 0.251 | 0.043 |
| 2 | | 0.412 | 0.048 |
| 3 | 0.051 | 0.512 | 0.095 |
| 4 | 0.048 | 0.562 | 0.087 |
| 5 | 0.026 | 0.602 | 0.026 |
| 6 | 0.028 | | 0.045 |
| 7 | 0.023 | 0.772 | 0.052 |
| 8 | 0.009 | 0.782 | 0.044 |
| 9 | 0.023 | 0.837 | 0.033 |
| 10 | | | 0.040 |
| 11 | | 0.716 | 0.037 |
| 12 | | | 0.034 |

The data in column II show that the hydrogen peroxide scrub does not significantly alter the stripping properties of $U_3O_8$ from the loaded organic phase. Without the hydrogen peroxide scrub the stripping cycle could not tolerate more than 0.4 gram per liter of Mo in the amine reagent without forming an insoluble third phase. The data in column III show that the Mo concentration can increase to more than 0.8 g./l. without the third phase forming when a hydrogen peroxide scrub is used.

The low consumption of hydrogen peroxide shown in column IV shows that the process can be used commercially without adding any significant cost to the recovery of $U_3O_8$.

*Example II*

In this example the runs were made in a manner generally similar to Example I. The ore which was extracted was taken from Section 10 of the Ambrosia Lake district of New Mexico. The liquor employed for the extraction had the following analysis:

| | |
|---|---|
| $U_3O_8$ | 1.05 gms. per liter. |
| Mo | 0.005 gms. per liter. |
| E.M.F. | 390 mv. |
| pH | 0.92. |

The organic amine reagent was the same employed in Example I as was the hydrogen peroxide scrub. The process involved a five-stage extraction circuit, a one-stage hydrogen peroxide scrub and a three-stage stripping circuit. The ratios of organic to aqueous phases were the same as in Example I. In this instance a 10 percent volume bleed stream was taken for the removal of molybdenum and this was stripped as in Example I. The results are indicated in the following table:

| I | II | III | IV |
|---|---|---|---|
| Cycles of Operation Based on Organic Flow | $U_3O_8$ in Uranium Barren Solution (g./l.) | Mo (g./l.) in Tri-Fatty Amine (g./l.) | $H_2O_2$ consumption per cycle, Lb. $H_2O_2$ per Lb. $U_3O_8$ in Feed Liquor |
| 2 | 0.005 | 0.183 | 0.023 |
| 4 | 0.004 | 0.124 | 0.035 |
| 6 | 0.004 | 0.123 | 0.028 |
| 8 | 0.006 | 0.057 | 0.010 |
| 10 | 0.005 | 0.068 | 0.021 |
| 12 | 0.005 | 0.066 | 0.024 |
| 14 | 0.007 | 0.067 | 0.019 |

*Example III*

In this example the runs were made in a manner generally similar to Example I. The ore which was extracted was taken from Kermac Nuclear Fuels, St. Anthony Ore. The liquor employed for the extraction had the following analysis:

| | |
|---|---|
| $U_3O_8$ | 1.11 gms. per liter. |
| Mo | 0.059 gms. per liter. |
| E.M.F. | 390 mv. |
| pH | 0.6. |

The amine reagent was composed of 92.5 parts by weight of kerosene, 2.5 parts by weight of 2-ethyl hexanol, and 5 parts by weight of the tertiary alkyl amine referred to in Example I. The extraction was conducted in five stages with a volume ratio of the organic extraction agent to acid liquor of 1:2, two stages of a hydrogen peroxide scrub of the uranium-pregnant amine reagent with a 1.5 percent by weight hydrogen peroxide solution having a pH of 1.0 (adjusted with sulfuric acid) and three stages of stripping with a 1 molar solution of sodium chloride acidified to pH 1.0 with sulfuric acid. The stripping circuit was operated with a volume ratio of organic amine reagent to acid stripping reagent of 3:1. A 20 volume percent bleed stream of the stripped organic phase was treated for the removal of molybdenum during the first nine cycles. Thereafter the bleed stream was reduced to 10 percent by volume for the next eight cycles and thereafter reduced to 5 percent by volume for the next six cycles. Thereafter the bleed stream was reduced to zero and the molybdenum allowed to build up in the circuit. After 25 cycles the molybdenum had built up to a level of 1.49 grams per liter and yellow solids began to precipitate out in the stripping circuit. This example demonstrates the tremendous tolerance of the system for molybdenum as long as the molybdenum is maintained in the molybdate form.

The data for this operation is to be found in the following table:

| I | II | III |
|---|---|---|
| Cycles of Operation Based On Organic Flow | $U_3O_8$ in Uranium Barren Solution (g./l.) | Mo (g./l.) in Tri-Fatty Amine (g./l.) |
| 1 | 0.010 | 0.13 |
| 2 | | 0.137 |
| 3 | | 0.180 |
| 4 | 0.010 | 0.210 |
| 5 | | 0.243 |
| 6 | | 0.282 |
| 7 | 0.012 | 0.283 |
| 8 | | 0.282 |
| 9 | | 0.296 |
| 10 | 0.015 | 0.335 |
| 11 | | 0.385 |
| 12 | | 0.422 |
| 13 | 0.010 | 0.458 |
| 14 | | 0.485 |
| 15 | | 0.467 |
| 16 | 0.010 | 0.577 |
| 17 | | 0.570 |
| 18 | | 0.607 |
| 19 | 0.015 | 0.656 |
| 20 | | 0.720 |
| 21 | | 0.744 |
| 22 | 0.020 | 0.795 |
| 23 | | 0.943 |
| 24 | 0.027 | 1.28 |
| 25 | 0.010 | 1.49 |

The data show that the peroxide scrub not only was not interfering with the extraction efficiency of the organic phase but also that the uranium was being effectively stripped from the organic phase while at the same time molybdenum was progressively building up in the organic phase.

In the place of the specific amine mentioned above any of a variety of amines may be used which are capable of extracting uranium from an acid leach liquor. These amines are generally aliphatic in character although they may be partially aromatic. In general, the amines are either secondary or tertiary amines. The preferred amines are the secondary or the tertiary amines containing aliphatic hydrocarbon groups of from approximately 8 to approximately 22 carbon atoms. These aliphatic hydrocarbon groups may be straight chain saturated or unsaturated. In place of these straight chain aliphatic hydrocarbon groups the amines may contain highly branched chain aliphatic hydrocarbon groups, which are principally derived from olefinic sources. In addition, it is possible to use amines containing one or more branched chain alkyl groups and/or one or more straight chain alkyl groups. Typical amines which may be used for this purpose are the following:

(1)

in which $R_1$ is an aliphatic hydrocarbon group having a tertiary carbon atom at the point at which it is attached to the nitrogen atom. The substituents attached to this tertiary carbon atom are alkyl groups totaling from 11 to 14 carbon atoms in the three alkyl groups. $R_2$ is a $C_{12}H_{25}$ group. A product of this type is available on the market and is sold as Amberlite LA-2.

(2)

in which $R_1$ is as above described and $R_3$ is the group

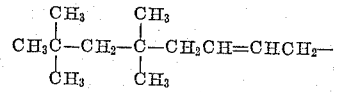

A product of this type is available on the market and is sold as Amberlite LA-1.

(3) Tri-isooctyl amine.

(4) The compound bis(1-isobutyl - 3,5 - dimethylhexyl) amine having the formula

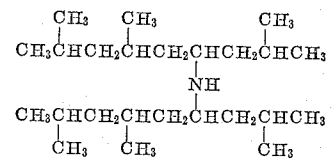

(5) Di(3,5,7-trimethyloctyl)amine having the formula

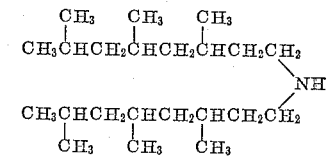

(6) 6-benzylamino-3,9 diethyltridecane having the formula

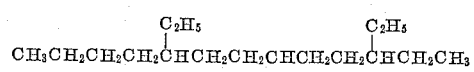

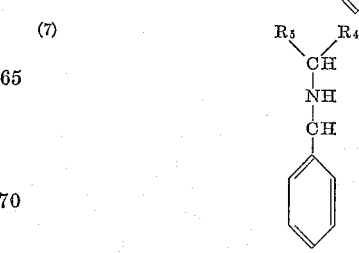

(7)

in which $R_4$ and $R_5$ are alkyl groups containing from 7 to 11 carbon atoms.

The stripping of the uranium-pregnant amine reagent is generally accomplished with an aqueous solution of an inorganic salt. In the examples sodium chloride was employed, however, other inorganic salts such as sodium sulfate, sodium nitrate and the corresponding potassium and ammonium salts could likewise be used. These stripping solutions are generally acid and have a pH below 7.0. The solution may be sufficiently acid as to have a pH approaching 0.

While hydrogen peroxide is the preferred oxidizing agent from the standpoint of cost and ease of operation, other oxidizing reagents such as sodium chlorate, ammonium persulfate, and chlorine may be used.

Stripping of molybdenum from the bleed stream of the amine reagent is preferably accomplished by means of the sodium carbonate solution. However, any alkaline solution having a pH in excess of 7 may be used. Such solutions may be alkali metal hydroxides or carbonates or the alkaline earth metal hydroxide. It is merely important to have a high pH in order to strip the molybdenum from the bleed stream.

Now, therefore, we claim:

1. Process of extracting uranium from a uranium ore containing molybdenum which comprises leaching the ore with a strong mineral acid to produce an aqueous solution containing uranium and molybdenum values, extracting the acid leach solution with an amine reagent to produce an amine extract containing molybdenum and uranium values, treating said extract with an oxidizing agent prior to stripping uranium from said extract to maintain the molybdenum in the molybdate form and to prevent precipitation of a complex of molybdyl molybdenum with the amine reagent and subsequently stripping uranium from said extract.

2. A process according to claim 1 in which the uranium is stripped from the extract with an aqueous solution of sodium chloride having a pH at least as low as 7.0.

3. A process according to claim 1 in which the uranium is stripped from the extract with an aqueous solution of sodium chloride having a pH below 1.5.

4. Process according to claim 1 in which the amine reagent is an amine selected from the group consisting of secondary and tertiary amines.

5. Process according to claim 1 in which the amine reagent is a secondary amine containing alkyl substituents each containing from 8 to 22 carbon atoms.

6. Process according to claim 1 in which the amine reagent is a tertiary amine containing alkyl substituents each containing from 8 to 22 carbon atoms.

7. Process according to claim 1 in which the oxidizing agent is hydrogen peroxide.

References Cited in the file of this patent

Nietzel et al.: WIN-30, Sept. 11, 1957, pp. 6-11.
Nietzel et al.: WIN-30, Sept. 11, 1957, page 4.
Gaudin: Proceedings of the International Conference on the Peaceful Uses of Atomic Energy, Aug. 8-20, 1955. vol. 8, pp. 8 and 9.
Ryon et al.: ORNL-2245, Mar. 27, 1957, pp. 4-13.
Brown et al.: AECD-4142, May 27, 1954, pp. 6-23, 32-39.
Crouse et al.: ORNL-2099, June 29, 1956, pp. 25-39.